US009432941B2

(12) United States Patent
Li et al.

(10) Patent No.: US 9,432,941 B2
(45) Date of Patent: Aug. 30, 2016

(54) METHOD FOR PERFORMING WAKE-UP CONTROL WITH AID OF WAKE-UP PACKET, AND ASSOCIATED APPARATUS

(71) Applicant: MEDIATEK INC., Hsin-Chu (TW)

(72) Inventors: Chiu-Wan Li, Chiayi (TW); Juei-Ting Sun, Kaohsiung (TW); Shuo-Jen Hsu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 214 days.

(21) Appl. No.: 14/073,879

(22) Filed: Nov. 7, 2013

(65) Prior Publication Data

US 2015/0012761 A1 Jan. 8, 2015

Related U.S. Application Data

(60) Provisional application No. 61/843,058, filed on Jul. 5, 2013.

(51) Int. Cl.
*H04W 52/02* (2009.01)
*G06F 1/32* (2006.01)

(52) U.S. Cl.
CPC ........ *H04W 52/0235* (2013.01); *G06F 1/3209* (2013.01)

(58) Field of Classification Search
CPC ............................. G06F 1/3203; G06F 1/3209
See application file for complete search history.

(56) References Cited

U.S. PATENT DOCUMENTS

| | | | | |
|---|---|---|---|---|
| 5,835,719 A | * | 11/1998 | Gibson | G06F 1/3209 709/221 |
| 2006/0112287 A1 | * | 5/2006 | Paljug | G06F 1/3209 713/300 |
| 2009/0063878 A1 | * | 3/2009 | Schmidt | G06F 1/3209 713/310 |
| 2010/0115302 A1 | * | 5/2010 | Cho | G06F 1/3203 713/310 |
| 2010/0165898 A1 | * | 7/2010 | Tang | H04W 52/0235 370/311 |
| 2010/0202354 A1 | * | 8/2010 | Ho | G06Q 10/06 370/328 |
| 2012/0214417 A1 | | 8/2012 | Woo | |
| 2013/0028162 A1 | | 1/2013 | Radulescu | |
| 2013/0065584 A1 | | 3/2013 | Lyon | |
| 2013/0109323 A1 | | 5/2013 | Ruutu | |
| 2013/0212413 A1 | * | 8/2013 | Berndt | G06F 1/3203 713/310 |
| 2013/0225077 A1 | * | 8/2013 | Schultz | H02J 7/025 455/41.1 |
| 2014/0032955 A1 | * | 1/2014 | Boelter | H04L 47/32 713/323 |
| 2014/0073252 A1 | * | 3/2014 | Lee | H04W 4/008 455/41.2 |
| 2014/0086125 A1 | * | 3/2014 | Polo | H04W 52/0229 370/311 |
| 2015/0271255 A1 | * | 9/2015 | Mackay | H04L 67/101 709/226 |

FOREIGN PATENT DOCUMENTS

| | | |
|---|---|---|
| CN | 1960365 A | 5/2007 |
| CN | 101785247 A | 7/2010 |
| CN | 102172081 A | 8/2011 |

(Continued)

*Primary Examiner* — Jaweed A Abbaszadeh
*Assistant Examiner* — Cheri Harrington
(74) *Attorney, Agent, or Firm* — Winston Hsu; Scott Margo

(57) ABSTRACT

A method and apparatus for performing wake-up control are provided, where the method is applied to an electronic device, and the method may include the steps of: detecting whether a predetermined wake-up action is input into the electronic device, wherein the predetermined wake-up action is a user action for wake-up control; and when it is detected that the predetermined wake-up action is input into the electronic device, sending a wake-up packet carrying predetermined wake-up information to allow an internal circuit of another electronic device to be woken up in response to detection of the predetermined wake-up information.

14 Claims, 8 Drawing Sheets

(56) References Cited

FOREIGN PATENT DOCUMENTS

| CN | 202049681 U | 11/2011 |
|---|---|---|
| JP | H1127306 A | 1/1999 |
| JP | 2001111582 A | 4/2001 |
| JP | 2005175625 A | 6/2005 |
| JP | 2006350800 A | 12/2006 |
| JP | 2009116503 A | 5/2009 |
| JP | 2012216884 A | 11/2012 |
| JP | 201362581 A | 4/2013 |
| WO | 2013003753 A2 | 1/2013 |

* cited by examiner

METHOD FOR PERFORMING WAKE-UP CONTROL WITH AID OF WAKE-UP PACKET, AND ASSOCIATED APPARATUS

CROSS REFERENCE TO RELATED APPLICATIONS

This application claims the benefit of U.S. Provisional Application No. 61/843,058, which was filed on Jul. 5, 2013, and is included herein by reference.

BACKGROUND

The present invention relates to controlling electronic devices that are in any of a standby mode, a suspended mode, or a sleep mode to become active, and more particularly, to a method for performing wake-up control, and to an associated apparatus.

A great number of conventional electronic devices such as mobile phones are equipped with powerful processors, which may easily devour the battery power thereof. According to the related art, controlling the processors mentioned above and the associated circuits to be inactive when they are not needed has become a common practice for digital product design. However, for one of the aforementioned conventional electronic devices, cost-effective wake-up mechanism by another device has not been well developed, where the conventional control mechanism is complicated, and therefore the related costs cannot be further reduced. Thus, a novel method is required for improving the wake-up control of an electronic device.

SUMMARY

It is an objective of the claimed invention to provide a method for performing wake-up control, and to an associated apparatus, in order to solve the related art problems.

It is another objective of the claimed invention to provide a method for performing wake-up control, and to an associated apparatus, in order to reduce the complexity of control mechanism and reduce the related costs.

According to at least one preferred embodiment, a method for performing wake-up control is provided, where the method is applied to an electronic device. The method comprises the steps of: detecting whether a predetermined wake-up action is input into the electronic device, wherein the predetermined wake-up action is a user action for wake-up control; and when it is detected that the predetermined wake-up action is input into the electronic device, sending a wake-up packet carrying predetermined wake-up information to allow an internal circuit of another electronic device to be woken up in response to detection of the predetermined wake-up information. More particularly, awake-up service circuit of the other electronic device receives the wake-up packet and detects whether the predetermined wake-up information exists in the wake-up packet. In addition, when it is detected that the predetermined wake-up information exists in the wake-up packet, the wake-up service circuit of the other electronic device controls the internal circuit of the other electronic device to resume from suspension.

According to at least one preferred embodiment, an apparatus for performing wake-up control is provided, where the apparatus comprises at least one portion of an electronic device. The apparatus comprises: a transmitter; and a processing circuit, coupled to the transmitter. In addition, the transmitter is arranged to transmit information for the electronic device, and the processing circuit is arranged to control operations of the electronic device. Additionally, the processing circuit detects whether a predetermined wake-up action is input into the electronic device, wherein the predetermined wake-up action is a user action for wake-up control. When it is detected that the predetermined wake-up action is input into the electronic device, the processing circuit sends, by utilizing the transmitter, a wake-up packet carrying predetermined wake-up information to allow an internal circuit of another electronic device to be woken up in response to detection of the predetermined wake-up information. More particularly, a wake-up service circuit of the other electronic device receives the wake-up packet and detects whether the predetermined wake-up information exists in the wake-up packet. When it is detected that the predetermined wake-up information exists in the wake-up packet, the wake-up service circuit of the other electronic device controls the internal circuit of the other electronic device to resume from suspension.

According to at least one preferred embodiment, a method for performing wake-up control is provided, where the method is applied to an electronic device. The method comprises the steps of: receiving a wake-up packet from another electronic device and detecting whether predetermined wake-up information exists in the wake-up packet; and when it is detected that the predetermined wake-up information exists in the wake-up packet, controlling an internal circuit of the electronic device to resume from suspension. More particularly, the other electronic device detects whether a predetermined wake-up action is input into the other electronic device, wherein the predetermined wake-up action is a user action for wake-up control. In addition, when it is detected that the predetermined wake-up action is input into the other electronic device, the other electronic device sends the wake-up packet carrying the predetermined wake-up information to allow the internal circuit of the electronic device to be woken up in response to detection of the predetermined wake-up information.

According to at least one preferred embodiment, an apparatus for performing wake-up control is provided, where the apparatus comprises at least one portion of an electronic device. The apparatus comprises: a receiver; and a wake-up service circuit, coupled to the receiver. In addition, the receiver is arranged to receive information for the electronic device, and the wake-up service circuit is arranged to provide the electronic device with a wake-up service. Additionally, the wake-up service circuit receives, by utilizing the receiver, a wake-up packet from another electronic device and detects whether predetermined wake-up information exists in the wake-up packet. When it is detected that the predetermined wake-up information exists in the wake-up packet, the wake-up service circuit controls an internal circuit of the electronic device to resume from suspension. More particularly, the other electronic device detects whether a predetermined wake-up action is input into the other electronic device, wherein the predetermined wake-up action is a user action for wake-up control. When it is detected that the predetermined wake-up action is input into the other electronic device, the other electronic device sends the wake-up packet carrying the predetermined wake-up information to allow the internal circuit of the electronic device to be woken up in response to detection of the predetermined wake-up information.

It is an advantage of the present invention that the present invention method and apparatus can use merely one wake-up packet to immediately control electronic devices that are in any of a standby mode, a suspended mode, or a sleep mode to become active. In addition, in comparison with the related art, the complexity of control mechanism is greatly reduced. As a result, the related costs can be reduced, and the related art problems can be prevented.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
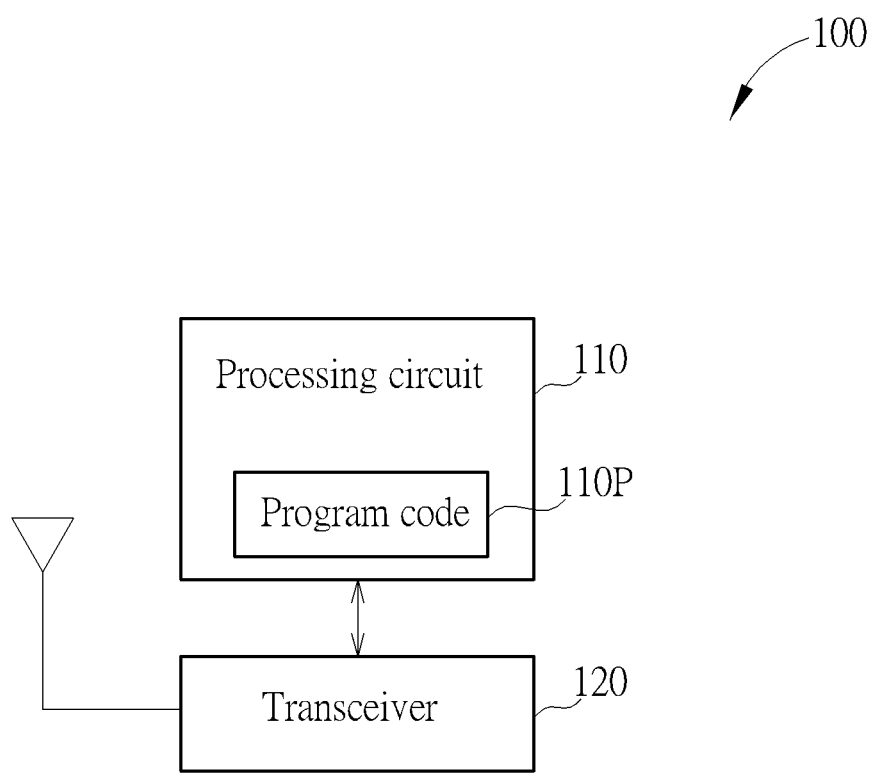
FIG. 1 is a diagram of an apparatus for performing wake-up control according to a first embodiment of the present invention.

Please refer to FIG. 1, which illustrates a diagram of an apparatus 100 for performing wake-up control according to a first embodiment of the present invention, where the apparatus 100 may comprise at least one portion (e.g. a portion or all) of an electronic device. For example, the apparatus 100 may comprise a portion of the electronic device mentioned above, and more particularly, can be at least one hardware circuit such as at least one integrated circuit (IC) within the electronic device. In another example, the apparatus 100 can be the whole of the electronic device mentioned above. In another example, the apparatus 100 may comprise a system comprising the electronic device mentioned above (e.g. an audio/video system comprising the electronic device). Examples of the electronic device may include, but not limited to, a mobile phone (e.g. a multi-functional mobile phone), a personal digital assistant (PDA), and a personal computer such as a laptop computer.

As shown in FIG. 1, the apparatus 100 may comprise a processing circuit 110 arrange to control operations of the electronic device, and may further comprise a transceiver 120 arranged to transmit or receive information for the electronic device, where the transceiver 120 is coupled to the processing circuit 110, and one or more antennas of the electronic device may be coupled to the transceiver 120. For example, the processing circuit 110 may comprise at least one processor and associated hardware resources, and the transceiver 120 may comprise a transmitter and a receiver such as those for wireless network communications, where the transmitter is arranged to transmit information for the electronic device and the receiver is arranged to receive information for the electronic device, and the processor may execute some program codes 110P retrieves from a storage module (e.g. a hard disk drive (HDD), or a non-volatile memory such as a Flash memory) within the electronic device to control the aforementioned operations of the electronic device.

According to this embodiment, the processing circuit 110 may detect (or monitor) whether a predetermined wake-up action is input into the electronic device such as a device A, where the predetermined wake-up action is typically a user action for wake-up control. In addition, when it is detected that the predetermined wake-up action is input into the electronic device, the processing circuit 110 may send, by utilizing the transceiver 120 (more particularly, the transmitter therein), a wake-up packet carrying predetermined wake-up information to allow an internal circuit (not shown in FIG. 1) of another electronic device such as a device B to be woken up in response to the detection of the predetermined wake-up information. More particularly, a wake-up service circuit (not shown in FIG. 1) of the other electronic device such as the device B receives the wake-up packet and detects whether the predetermined wake-up information exists in the wake-up packet. When it is detected that the predetermined wake-up information exists in the wake-up packet, the wake-up service circuit of the other electronic device such as the device B controls the internal circuit mentioned above to resume from suspension.

For example, in a situation where the user shakes the electronic device, the wake-up action may represent the shaking action that the user applied to the electronic device such as the device A. Then, the electronic device such as the device A sends the wake-up packet carrying the predetermined wake-up information. As a result, the aforementioned internal circuit of the other electronic device such as the device B may resume from suspension, and more particularly, resume from any of a standby mode, a suspended mode, or a sleep mode to become active. This is for illustrative purposes only, and is not meant to be a limitation of the present invention. In another example, in a situation where the user presses a wake-up key (e.g. a physical key or button of the electronic device, or a virtual button on a touch-sensitive display panel of the electronic device), the wake-up action may represent the pressing action that the user applied to the wake-up key of the electronic device such as the device A. Then, the electronic device such as the device A sends the wake-up packet carrying the predetermined wake-up information. As a result, the aforementioned internal circuit of the other electronic device such as the device B may resume from suspension, and more particularly, resume from any of a standby mode, a suspended mode, or a sleep mode to become active.

Figure 2:
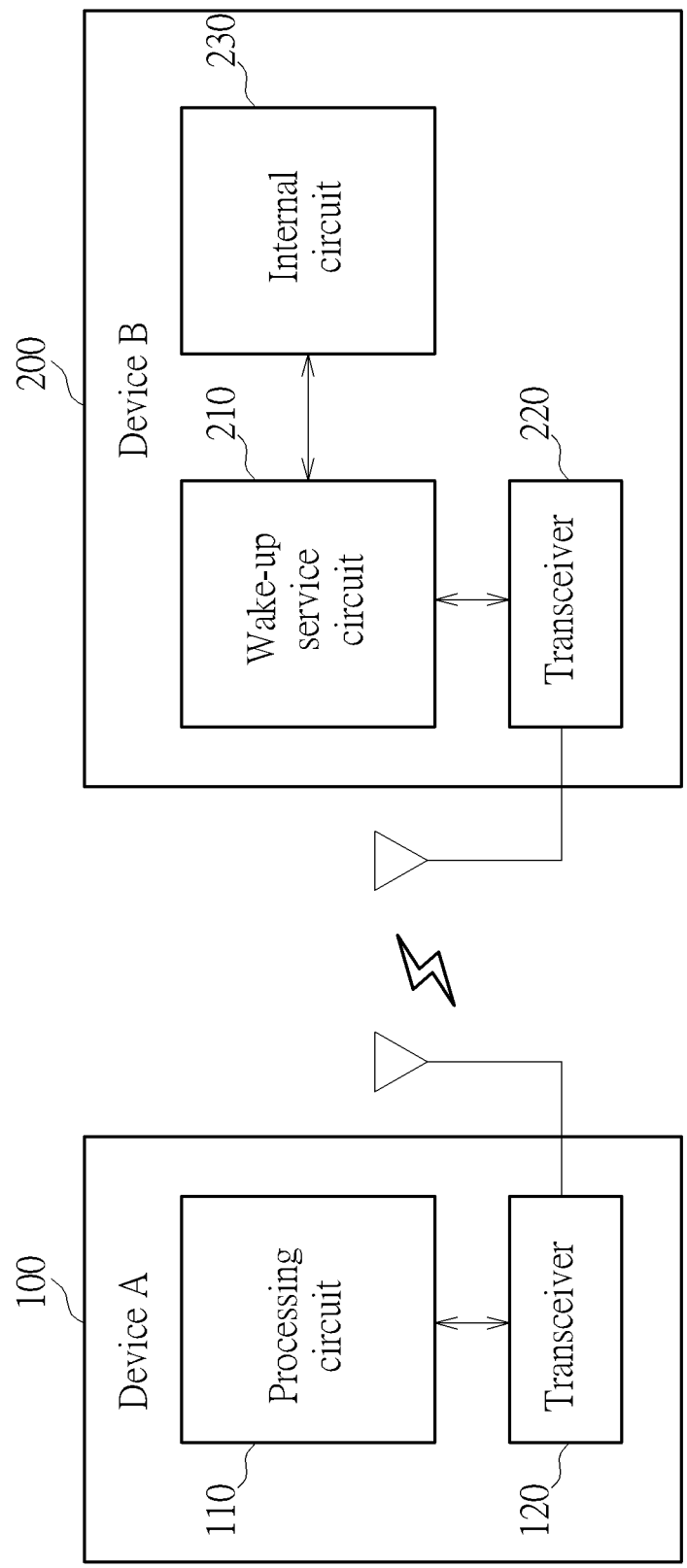
FIG. 2 illustrates a wireless system comprising the aforementioned electronic device according to an embodiment of the present invention.

FIG. 2 illustrates a wireless system comprising the aforementioned electronic device of the embodiment shown in FIG. 1 according to an embodiment of the present invention. In this embodiment, the wireless system comprises the apparatus 100 mentioned above and an apparatus 200 for performing wake-up control, and the apparatus 200 may comprise a wake-up service circuit 210, a transceiver 220, and an internal circuit 230, where the transceiver 220 typically comprises a transmitter arranged to transmit information for the device B and further comprises a receiver arranged to receive information for the device B, and the wake-up service circuit 210 is arranged to provide the device B with a wake-up service. Please note that the wake-up service circuit 210 can be taken as an example of the wake-up service circuit of the other electronic device mentioned above, and the internal circuit 230 can be taken as an example of the internal circuit of the other electronic device mentioned above.

More particularly, in a situation where the device A is the electronic device of the embodiment shown in FIG. 1 and the device B is the other electronic device of the embodiment shown in FIG. 1, the apparatus 100 may comprise the whole of the device A in this embodiment, and the apparatus 200 may comprise the whole of the device B in this embodiment. This is for illustrative purposes only, and is not meant to be a limitation of the present invention. According to some variations of this embodiment, the apparatus 200 may comprise at least one portion (e.g. a portion or all) of the other electronic device, such as at least one portion (e.g. a portion or all) of the device B. For example, the device A can be a remote controller, and the device B can be a television (TV). This is for illustrative purposes only, and is not meant to be a limitation of the present invention.

According to this embodiment, a portion of the device B, such as the internal circuit 230, may enter the standby mode thereof, the suspended mode thereof, or the sleep mode thereof to become inactive, and the device A may wake the device B up by using one or more wake-up packets, and more particularly, by repeatedly sending the wake-up packet mentioned above for a predetermined time interval (e.g. one or more seconds) or for a predetermined number of times (e.g. two or more times), in order to increase the probability of successfully receiving the wake-up packet by the device B. More particularly, in a situation where the electronic device is the aforementioned mobile phone (e.g. the multi-functional mobile phone mentioned above), the device A may represent the electronic device running specific program code(s), for playing the role of the remote controller such as that shown in FIG. 2. This is for illustrative purposes only, and is not meant to be a limitation of the present invention.

In practice, the internal circuit 230 shown in FIG. 2 may comprise a processor and/or a Wireless-Fidelity (Wi-Fi) control circuit of the device B. For example, the internal circuit 230 may comprise the processor of the device B. In another example, the internal circuit 230 may comprise the Wi-Fi control circuit of the device B. In another example, the internal circuit 230 may comprise the processor and the Wi-Fi control circuit of the device B.

Figure 3:
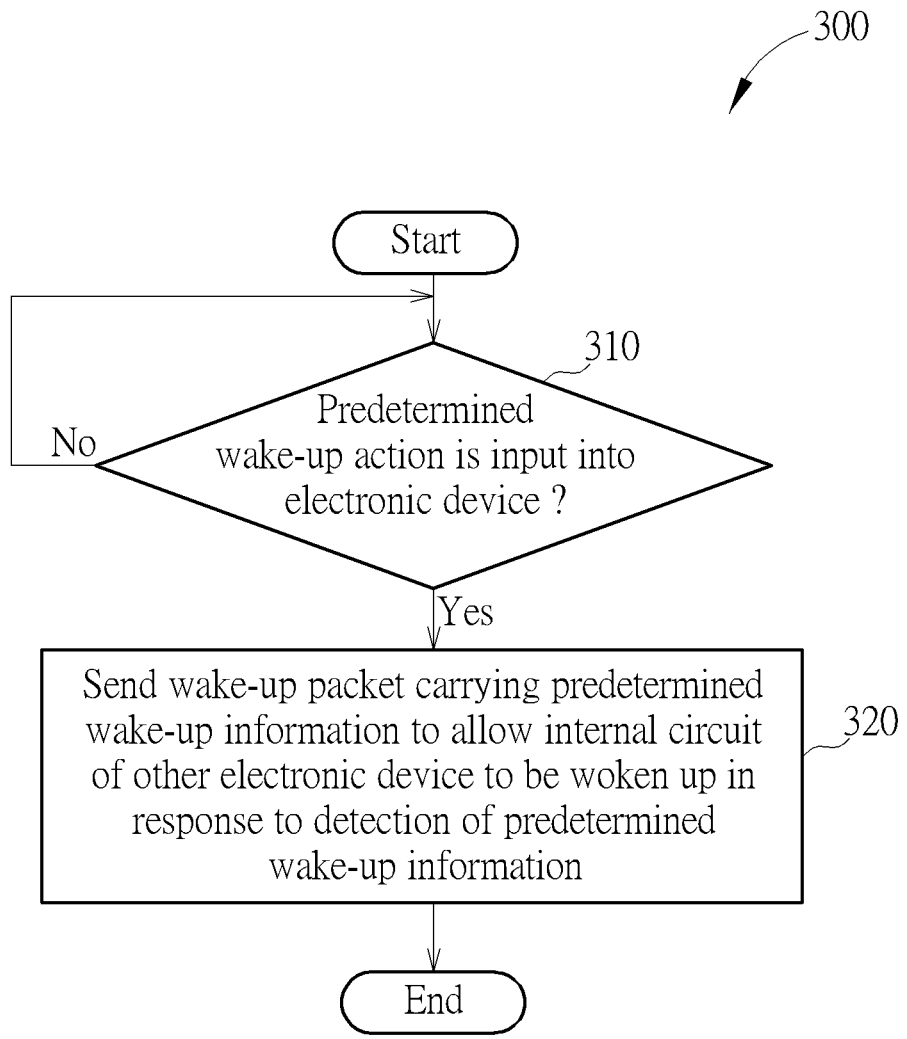
FIG. 3 illustrates a flowchart of a method for performing wake-up control according to an embodiment of the present invention.

FIG. 3 illustrates a flowchart of a method 300 for performing wake-up control according to an embodiment of the present invention. The method 300 shown in FIG. 3 can be applied to the apparatus 100 shown in FIG. 1 (more particularly, the device A shown in FIG. 2), and can be applied to the processing circuit 110 thereof (more particularly, the processing circuit 110 executing the program codes 110P of the embodiment shown in FIG. 1). The method 300 is described as follows.

In Step 310, the processing circuit 110 detects (or monitors) whether the predetermined wake-up action is input into the electronic device such as the device A, where the predetermined wake-up action is typically a user action for wake-up control. For example, the processing circuit 110 may detect information received from the other electronic device such as the device B. When the information received from the other electronic device such as the device B indicates an inactive status of the other electronic device (e.g. the aforementioned standby mode, the aforementioned suspended mode, or the aforementioned sleep mode of the device B), the processing circuit 110 starts detecting whether the predetermined wake-up action is input into the electronic device. As shown in FIG. 3, when it is detected that the predetermined wake-up action is input into the electronic device, Step 320 is entered; otherwise, Step 310 is re-entered.

In Step 320, the processing circuit 110 sends, by utilizing the transceiver 120 (more particularly, the transmitter therein), the wake-up packet carrying the predetermined wake-up information to allow the internal circuit of the other electronic device such as a device B to be woken up in response to the detection of the predetermined wake-up information. More particularly, the wake-up service circuit 210 of the other electronic device such as the device B receives the wake-up packet and detects whether the predetermined wake-up information exists in the wake-up packet. When it is detected that the predetermined wake-up information exists in the wake-up packet, the wake-up service circuit 210 of the other electronic device such as the device B controls the internal circuit 230 mentioned above to resume from suspension.

According to this embodiment, the predetermined wake-up information may comprise a company identification (ID), such as the company ID of the manufacturer of the electronic device. More particularly, the predetermined wake-up information may further comprise a sequence number Seq, which can be utilized for wake-up control, and the sequence number Seq can be a variable corresponding to the number of times that the predetermined wake-up action is detected. For example, the sequence number Seq may fall into the range of the interval [0x01, 0xFF], and may be increased with an increment of one when the predetermined wake-up action is detected, where the sequence number Seq may vary in a cyclic manner. As a result of using the sequence number Seq, the correctness of the wake-up control can be guaranteed. In addition, the predetermined wake-up information may further comprise a predetermined wake-up pattern (e.g. a predetermined set of binary values), which can also be utilized for wake-up control. For example, when it is detected that the predetermined wake-up pattern exists in the wake-up packet, the wake-up service circuit 210 of the other electronic device such as the device B controls the internal circuit 230 mentioned above to resume from suspension.

According to some embodiments of the present invention, such as some variations of the embodiment shown in FIG. 3, the wake-up packet can be a Bluetooth Low Energy (BLE) advertising packet, such as one of an ADV_IND packet, an ADV_NONCONN_IND packet, and an ADV_SCAN_IND packet, where based upon the conventional BLE concept in the related art, the ADV_IND packet, the ADV_NONCONN_IND packet, and the ADV_SCAN_IND packet are utilized for some other purposes, rather than wake-up control. For example, the internal circuit 230 may enter the aforementioned standby mode, the aforementioned suspended mode, or the aforementioned sleep mode of the device B and therefore become inactive (e.g. in a situation where internal circuit 230 represent the processor for controlling the whole of the device B, the device B may become inactive), and then the wake-up service circuit 210 of the other electronic device such as the device B may scan for the wake-up packet. This is for illustrative purposes only, and is not meant to be a limitation of the present invention. In some other examples, the wake-up service circuit 210 of the other electronic device such as the device B may scan for the wake-up packet at any time, no matter whether the internal circuit 230 (or the device B) has become inactive or not.

According to some embodiments of the present invention, such as some variations of the embodiment shown in FIG. 3, the wake-up packet can be a Bluetooth (BT) packet, and more particularly, can be an extended inquiry response (EIR) packet. For example, the wake-up service circuit 210 of the other electronic device such as the device B may perform inquiry for discovering the electronic device such as the device A, and the electronic device such as the device A may send the EIR packet in response to the inquiry. This is for illustrative purposes only, and is not meant to be a limitation of the present invention.

Figure 4:
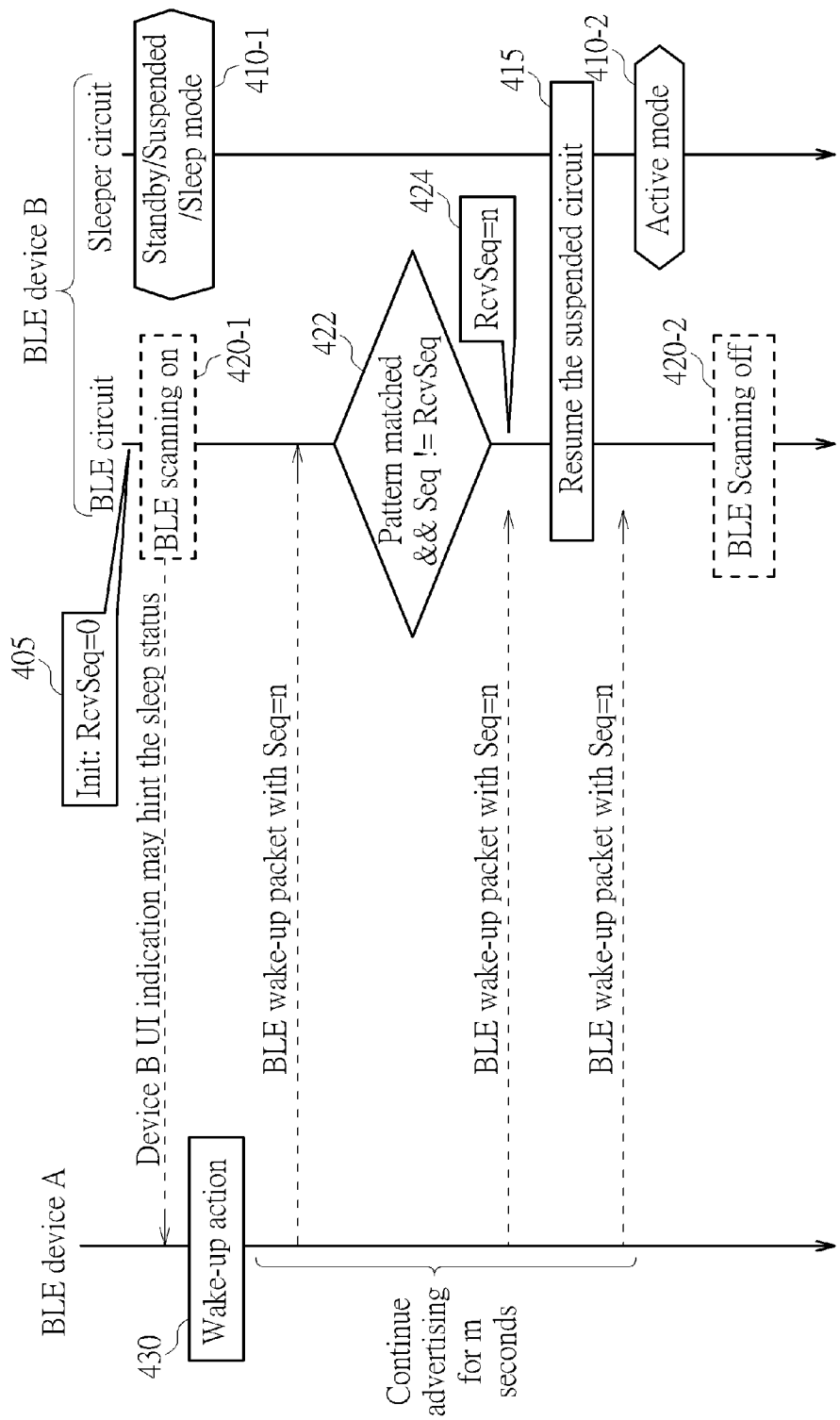
FIG. 4 illustrates a control scheme involved with the method shown in FIG. 3 according to an embodiment of the present invention.

FIG. 4 illustrates a control scheme involved with the method 300 shown in FIG. 3 according to an embodiment of the present invention, where the wake-up packet can be a BLE advertising packet (e.g. one of the ADV_IND packet, the ADV_NONCONN_IND packet, and the ADV_S-CAN_IND packet). The BLE device A shown in FIG. 4 can be taken as an example of the device A shown in FIG. 2, and the BLE device B shown in FIG. 4 can be taken as an example of the device B shown in FIG. 2. In addition, the BLE circuit shown in FIG. 4 can be taken as an example of the wake-up service circuit 210 shown in FIG. 2, and the sleeper circuit shown in FIG. 4 can be taken as an example of the internal circuit 230 shown in FIG. 2. Additionally, any of the BLE wake-up packets shown in FIG. 4 can be taken as an example of the wake-up packet mentioned in Step 320. According to this embodiment, the BLE device A can be regarded as a waking device (i.e. the device that wakes another up), while the BLE device B can be regarded as a sleeper device.

In Step 405, the BLE circuit initializes an index RcvSeq to be zero (labeled "init: RcvSeq=0" in FIG. 4, for brevity).

In Step 410-1, the sleeper circuit enters the standby mode thereof, the suspended mode thereof, or the sleep mode thereof (labeled "Standby/Suspended/Sleep mode" in FIG. 4, for brevity), and therefore becomes inactive. For example, the sleeper circuit may send a command to the BLE circuit, and then Step 420-1 is entered. This is for illustrative purposes only, and is not meant to be a limitation of the present invention.

In Step 420-1, the BLE circuit turns on the BLE scanning functionality (labeled "BLE scanning on" in FIG. 4, for brevity). For example, the device B user interface (UI) indication (i.e. the UI indication of the BLE device B) may hint the sleep status of the BLE device B. This is for illustrative purposes only, and is not meant to be a limitation of the present invention.

In Step 430, the processing circuit 110 detects that the predetermined wake-up action is input into the BLE device A (labeled "Wake-up action" in FIG. 4, for brevity). More particularly, when it is detected that the predetermined wake-up action is input into the BLE device A, the processing circuit 110 may start repeatedly sending, by utilizing the transceiver 120 (more particularly, the transmitter therein), the wake-up packet carrying the predetermined wake-up information for the predetermined time interval mentioned above (e.g. one or more seconds) or for the predetermined number of times mentioned above (e.g. two or more times), in order to increase the probability of successfully receiving the wake-up packet by the BLE device B. For example, the predetermined time interval or the predetermined number of times can be adjusted when needed, and more particularly, can be adjusted according to the remote receiver performance (e.g. the receiver performance of the transceiver 220). This is for illustrative purposes only, and is not meant to be a limitation of the present invention.

As shown in FIG. 4, under control of the processing circuit 110, the BLE device A continues advertising (e.g., by repeatedly sending the wake-up packet carrying the predetermined wake-up information) form seconds, where the value m may represent a positive real number in this embodiment. In addition, as mentioned above, the sequence number Seq can be a variable corresponding to the number of times that the predetermined wake-up action is detected. For example, in a situation where the predetermined wake-up action has been detected for n times (e.g. the value n may represent a positive integer in this embodiment), the processing circuit 110 may set the sequence number Seq to be equal to n (labeled "Seq=n" in FIG. 4).

In Step 422, the BLE circuit checks whether the pattern in a specific field of a received packet is exactly the same as the predetermined wake-up pattern and whether the sequence number Seq of this received packet and the index RcvSeq are not equal to each other (labeled "Pattern matched && Seq !=RcvSeq" in FIG. 4, for brevity). When it is detected that the pattern in the specific field of the received packet is exactly the same as the predetermined wake-up pattern and that the sequence number Seq of this received packet and the index RcvSeq are not equal to each other, Step 424 is entered; otherwise, Step 422 may be re-entered, for checking with further received packet(s).

In Step 424, the BLE circuit sets the index RcvSeq to be n (labeled "RcvSeq=n" in FIG. 4, for brevity), where the value n can be obtained from the sequence number Seq of the received packet that passes the checking operation of Step 422.

In Step 415, the BLE circuit controls the sleeper circuit to resume from suspension (labeled "Resume the suspended circuit" in FIG. 4, for brevity).

In Step 410-2, the sleeper circuit enters the active mode thereof, as a result of the operation of Step 415.

In Step 420-2, the BLE circuit turns off the BLE scanning functionality (labeled "BLE scanning off" in FIG. 4, for brevity).

Please note that the operations of some steps such as Step 420-1 and Step 420-2 are illustrated in FIG. 4. This is for illustrative purposes only, and is not meant to be a limitation of the present invention. According to some variations of this embodiment, Step 420-1 and Step 420-2 may be optional. For example, the BLE scanning functionality may be turned on by default, and therefore Step 420-1 and Step 420-2 may be removed from FIG. 4 in these variations.

Figure 5:
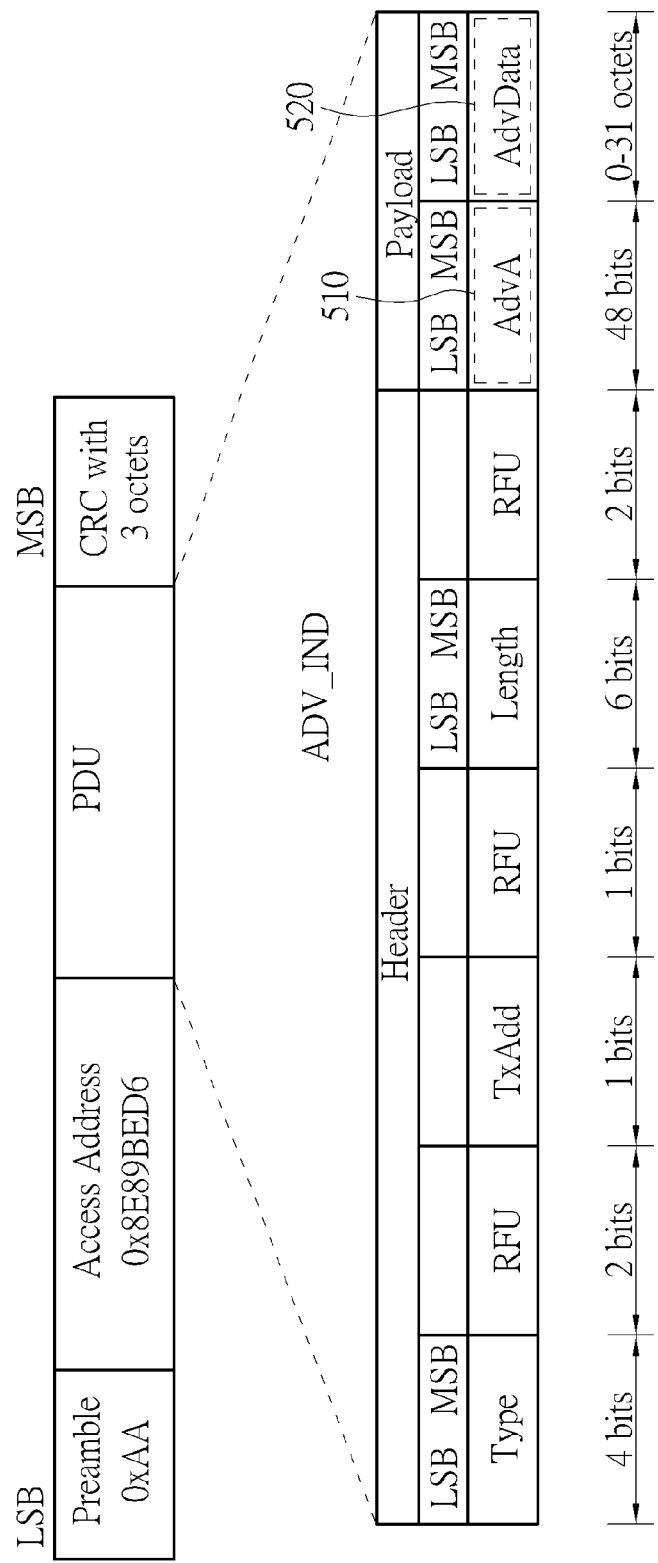
FIG. 5 illustrates the arrangement of the predetermined wake-up information in the wake-up packet of the control scheme shown in FIG. 4 according to an embodiment of the present invention.

FIG. 5 illustrates the arrangement of the predetermined wake-up information in the wake-up packet of the control scheme shown in FIG. 4 according to an embodiment of the present invention. For example, the wake-up packet may comprise a preamble (e.g. 0xAA in this embodiment), an access address (e.g. 0x8E89BED6 in this embodiment), a protocol data unit (PDU), and a Cyclic Redundancy Check (CRC) code with 3 octets. In this embodiment, the processing circuit 110 may control a first partial payload 510 of the wake-up packet to comprise the BT address of the device A, and may further control a second partial payload 520 of the wake-up packet to comprise the predetermined wake-up information.

Taking the ADV_IND packet as an example of the BLE advertising packet mentioned above, the field AdvA may carry a 6-octet source BT address, and the field AdvData may carry the predetermined wake-up information. For example, the predetermined wake-up information carried by the field AdvData may comprise a plurality of sets of wake-up information octets, which are arranged in some sub-fields for indicating the wake-up information length, the manufacturer data, the company ID, the sequence number Seq, the predetermined wake-up pattern, and the sleeper circuit ID, respectively. In this embodiment, the plurality of sets of wake-up information octets can be {0x14}, {0xFF}, {0x00 0x46}, the aforementioned value n in the hexadecimal form thereof, {0x4D6564696174656B5456}, and the Wi-Fi Media Access Control (MAC) address of the Wi-Fi control circuit of the device B, which are the wake-up information length, the manufacturer data, the company ID, the sequence number Seq, the predetermined wake-up pattern, and the sleeper circuit ID of this embodiment, respectively. This is for illustrative purposes only, and is not meant to be a limitation of the present invention. In some other examples, at least one portion (e.g. a portion or all) of the plurality of sets of wake-up information octets may be varied.

For better comprehension, the ADV_IND packet is taken as an example of the BLE advertising packet in this embodiment. This is for illustrative purposes only, and is not meant to be a limitation of the present invention. According to a variation of this embodiment, the BLE advertising packet can be the ADV_NONCONN_IND packet. According to another variation of this embodiment, the BLE advertising packet can be the ADV_SCAN_IND packet. Please note that the contents of the header shown in the lower left of FIG. 5 are well known in the related art, and therefore are not described in detail.

Figure 6:
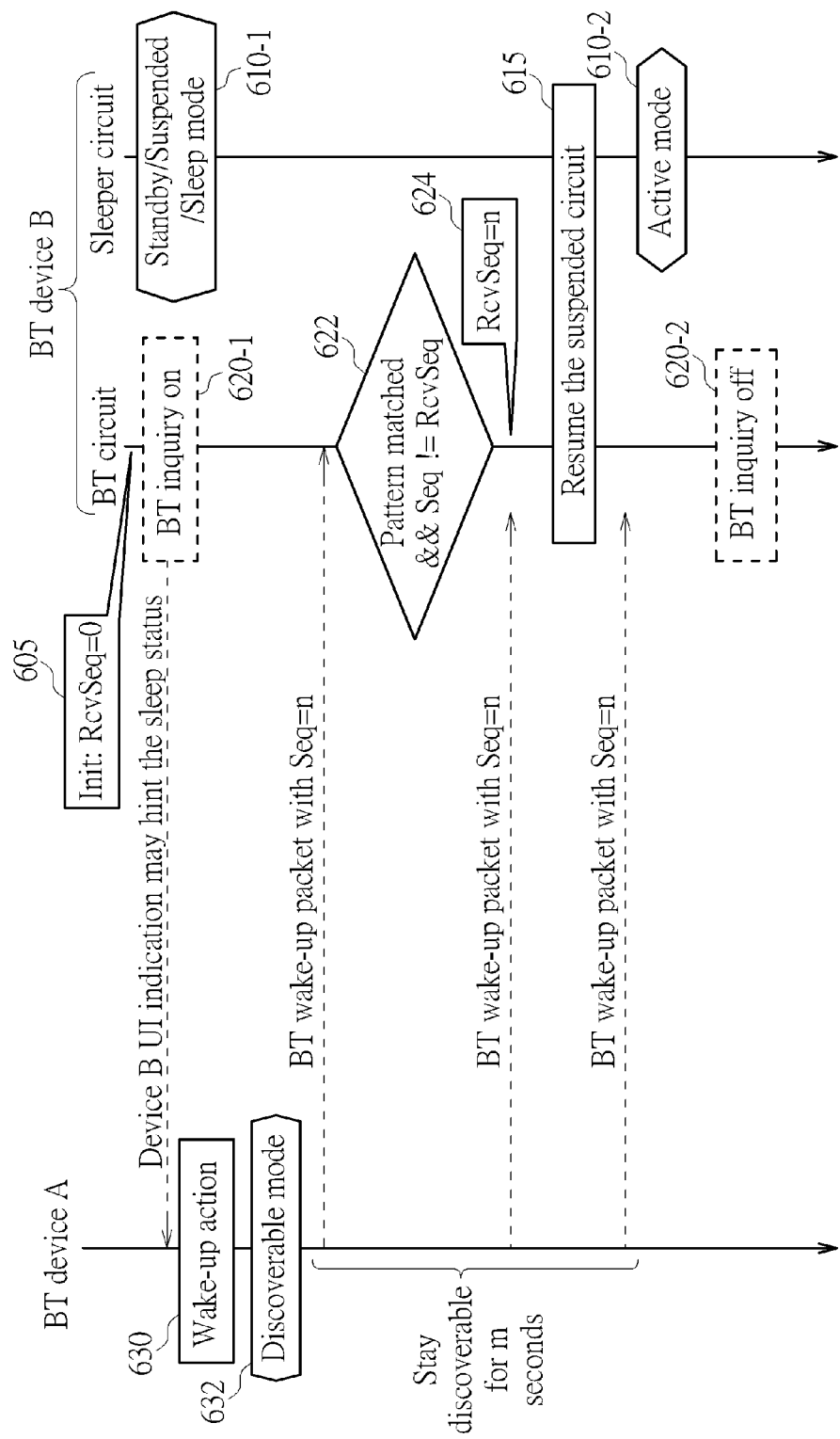
FIG. 6 illustrates a control scheme involved with the method shown in FIG. 3 according to another embodiment of the present invention.

FIG. 6 illustrates a control scheme involved with the method 300 shown in FIG. 3 according to another embodiment of the present invention, where the wake-up packet can be a BT packet (e.g. the EIR packet). The BT device A shown in FIG. 6 can be taken as an example of the device A shown in FIG. 2, and the BT device B shown in FIG. 6 can be taken as an example of the device B shown in FIG. 2. In addition, the BT circuit shown in FIG. 6 can be taken as an example of the wake-up service circuit 210 shown in FIG. 2, and the sleeper circuit shown in FIG. 6 can be taken as an example of the internal circuit 230 shown in FIG. 2. Additionally, any of the BT wake-up packets shown in FIG. 6 can be taken as an example of the wake-up packet mentioned in Step 320. According to this embodiment, the BT device A can be regarded as a waking device, while the BT device B can be regarded as a sleeper device.

In Step 605, the BT circuit initializes an index RcvSeq to be zero (labeled "init: RcvSeq=0" in FIG. 6, for brevity).

In Step 610-1, the sleeper circuit enters the standby mode thereof, the suspended mode thereof, or the sleep mode thereof (labeled "Standby/Suspended/Sleep mode" in FIG. 6, for brevity), and therefore becomes inactive. For example, the sleeper circuit may send a command to the BT circuit, and then Step 620-1 is entered. This is for illustrative purposes only, and is not meant to be a limitation of the present invention.

In Step 620-1, the BT circuit turns on the BT inquiry functionality (labeled "BT inquiry on" in FIG. 6, for brevity). For example, the device B UI indication (i.e. the UI indication of the BT device B) may hint the sleep status of the BT device B. This is for illustrative purposes only, and is not meant to be a limitation of the present invention.

In Step 630, the processing circuit 110 detects that the predetermined wake-up action is input into the BT device A (labeled "Wake-up action" in FIG. 6, for brevity). When it is detected that the predetermined wake-up action is input into the BT device A, Step 632 is entered.

In Step 632, under control of the processing circuit 110, the BT device A enters the discoverable mode thereof. More particularly, the processing circuit 110 may start repeatedly sending, by utilizing the transceiver 120 (more particularly, the transmitter therein), the wake-up packet carrying the predetermined wake-up information for the predetermined time interval mentioned above (e.g. one or more seconds) or for the predetermined number of times mentioned above (e.g. two or more times), in order to increase the probability of successfully receiving the wake-up packet by the BT device B. For example, the predetermined time interval or the predetermined number of times can be adjusted when needed, and more particularly, can be adjusted according to the remote receiver performance (e.g. the receiver performance of the transceiver 220). This is for illustrative purposes only, and is not meant to be a limitation of the present invention.

As shown in FIG. 6, under control of the processing circuit 110, the BT device A stays discoverable (e.g., by repeatedly sending the wake-up packet carrying the predetermined wake-up information) for m seconds, where the value m may represent a positive real number in this embodiment. In addition, as mentioned above, the sequence number Seq can be a variable corresponding to the number of times that the predetermined wake-up action is detected. For example, in a situation where the predetermined wake-up action has been detected for n times (e.g. the value n may represent a positive integer in this embodiment), the processing circuit 110 may set the sequence number Seq to be equal to n (labeled "Seq=n" in FIG. 6).

In Step 622, the BT circuit checks whether the pattern in a specific field of a received packet is exactly the same as the predetermined wake-up pattern and whether the sequence number Seq of this received packet and the index RcvSeq are not equal to each other (labeled "Pattern matched && Seq !=RcvSeq" in FIG. 6, for brevity). When it is detected that the pattern in the specific field of the received packet is exactly the same as the predetermined wake-up pattern and that the sequence number Seq of this received packet and the index RcvSeq are not equal to each other, Step 624 is entered; otherwise, Step 622 may be re-entered, for checking with further received packet(s).

In Step 624, the BT circuit sets the index RcvSeq to be n (labeled "RcvSeq=n" in FIG. 6, for brevity), where the value n can be obtained from the sequence number Seq of the received packet that passes the checking operation of Step 622.

In Step 615, the BT circuit controls the sleeper circuit to resume from suspension (labeled "Resume the suspended circuit" in FIG. 6, for brevity).

In Step 610-2, the sleeper circuit enters the active mode thereof, as a result of the operation of Step 615.

In Step 620-2, the BT circuit turns off the BT inquiry functionality (labeled "BT inquiry off" in FIG. 6, for brevity).

Please note that the operations of some steps such as Step 620-1 and Step 620-2 are illustrated in FIG. 6. This is for illustrative purposes only, and is not meant to be a limitation of the present invention. According to some variations of this embodiment, Step 620-1 and Step 620-2 may be optional. For example, the BT inquiry functionality may be turned on by default, and therefore Step 620-1 and Step 620-2 may be removed from FIG. 6 in these variations.

Figure 7:
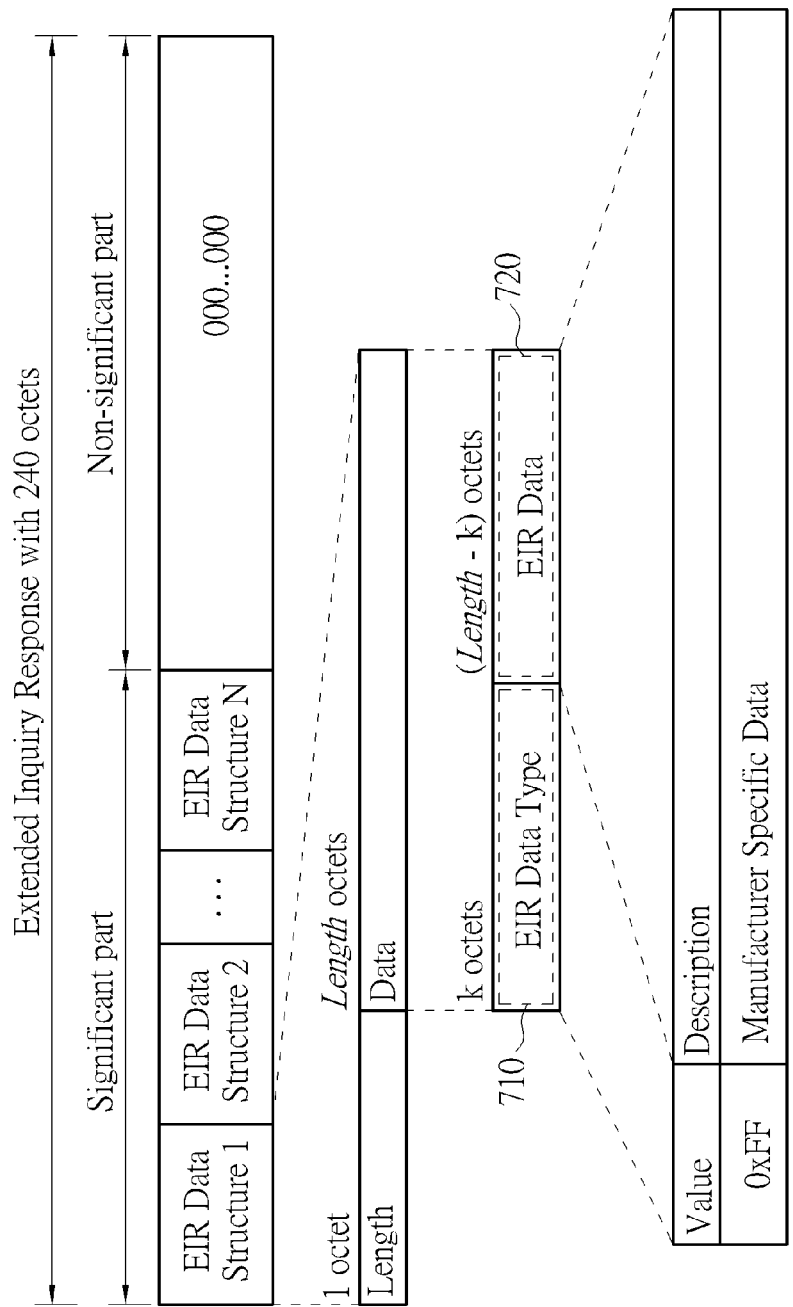
FIG. 7 illustrates the arrangement of the predetermined wake-up information in the wake-up packet of the control scheme shown in FIG. 6 according to an embodiment of the present invention.

FIG. 7 illustrates the arrangement of the predetermined wake-up information in the wake-up packet of the control scheme shown in FIG. 6 according to an embodiment of the present invention. For example, the wake-up packet of this embodiment can be an EIR packet (labeled "Extended Inquiry Response with 240 octets" in FIG. 7), and may comprise a significant part and a non-significant part, where the significant part may comprise one or more EIR data structures such as the EIR data structures 1, 2, ..., and N shown in FIG. 7. In this embodiment, the processing circuit 110 may control a first partial structure 710 of the wake-up packet to comprise the EIR data type, and may further control a second partial structure 720 of the wake-up packet to comprise the predetermined wake-up information.

As shown in FIG. 7, the processing circuit 110 may control the first partial structure 710 and the second partial structure 720 to be within the EIR data structure 1, where the processing circuit 110 may control the other data structures within the data structures 1, 2, ..., and N to be all full of zero values, and may also control the non-significant part to be full of zero values. This is for illustrative purposes only, and is not meant to be a limitation of the present invention. According to a variation of this embodiment, it is unnecessary that the other data structures within the data structures 1, 2, ..., and N are all full of zero values. According to another variation of this embodiment, it is unnecessary that the non-significant part are full of zero values. According to another variation of this embodiment, the first partial structure 710 and the second partial structure 720 can be within any data structure of the data structures 1, 2, ..., and N, where the processing circuit 110 may control the other data structures within the data structures 1, 2, ..., and N to be all full of zero values.

In this embodiment, the field Length of the EIR data structure 1 may carry a 1-octet value Length, which indicates the length of the field Data of the EIR data structure 1 in units of octets. In addition, the field Data can be divided into two parts, a k-octet part labeled "EIR Data Type" and a (Length−k)-octet part labeled "EIR Data", which are utilized as the first partial structure 710 and the second partial structure 720 of this embodiment, respectively. More particularly, the k-octet part of the field Data may carry the aforementioned manufacturer data (such as {0xFF}, which can be taken as an example, for better comprehension), and the (Length−k)-octet part of the field Data may carry some other portions of the predetermined wake-up information mentioned above, such as those regarded as the manufacturer specific data (labeled "Manufacturer Specific Data" in FIG. 7), where the value k can be a positive integer. For example, these portions of the predetermined wake-up information carried by the (Length−k)-octet part of the field Data may comprise a plurality of sets of wake-up information octets, which are arranged in some sub-fields for indicating the company ID, the sequence number Seq, the predetermined wake-up pattern, and the sleeper circuit ID, respectively. In this embodiment, the manufacturer data can be { 0xFF}, and the plurality of sets of wake-up information octets within the (Length−k)-octet part of the field Data can be {0x00 0x46}, the aforementioned value n in the hexadecimal form thereof, {0x4D6564696174656B5456}, and the Wi-Fi MAC address of the Wi-Fi control circuit of the device B, which are the company ID, the sequence number Seq, the predetermined wake-up pattern, and the sleeper circuit ID of this embodiment, respectively. This is for illustrative purposes only, and is not meant to be a limitation of the present invention. In some other examples, at least one portion (e.g. a portion or all) of the plurality of sets of wake-up information octets may be varied.

Figure 8:
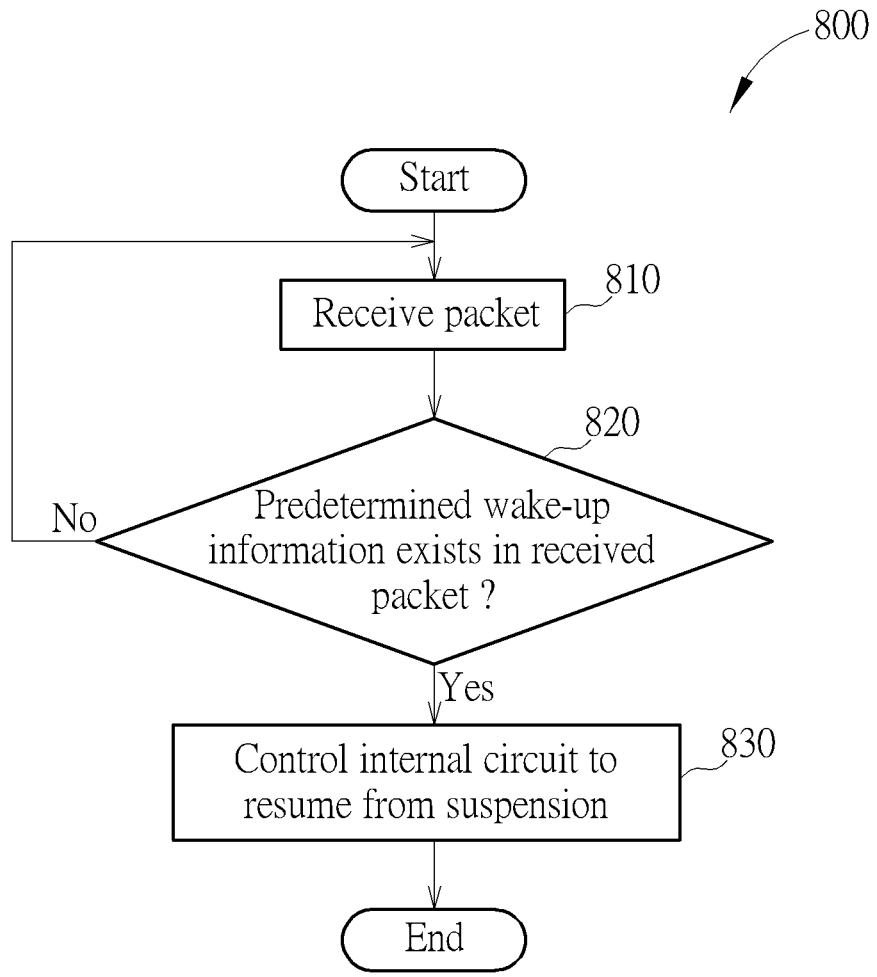
FIG. 8 illustrates a flowchart of a method for performing wake-up control according to another embodiment of the present invention.

FIG. 8 illustrates a flowchart of a method for performing wake-up control according to another embodiment of the present invention. The method 800 shown in FIG. 8 can be applied to the apparatus 200 shown in FIG. 2 (more particularly, the device B mentioned above), and can be applied to the wake-up service circuit 210 thereof. The method 800 is described as follows.

In Step 810, the wake-up service circuit 210 receives, by utilizing the transceiver 220 (more particularly, the receiver therein), a packet such as the wake-up packet mentioned in Step 320, where the received packet is sent from the electronic device of the embodiment shown in FIG. 1, such as the device A shown in FIG. 2. For example, the received packet can be one of the BLE wake-up packets shown in FIG. 4. In another example, the received packet can be one of the BT wake-up packets shown in FIG. 6.

In Step 820, the wake-up service circuit 210 detects whether predetermined wake-up information exists in the received packet such as the wake-up packet. When it is detected that the predetermined wake-up information exists in the received packet such as the wake-up packet, Step 830 is entered; otherwise, Step 810 is re-entered.

In Step 830, the wake-up service circuit 210 controls the internal circuit 230 (which is in the device B in this embodiment) to resume from suspension.

Please note that the method 800 shown in FIG. 8 may focus on the operations corresponding to the device B shown in FIG. 2, while the method 300 shown in FIG. 3 may focus on the operations corresponding to the device A shown in FIG. 2. Thus, the descriptions in the variations of the embodiment shown in FIG. 3 can be applied to the method 800 shown in FIG. 8.

For example, according to some variations of the embodiment shown in FIG. 8, the wake-up packet can be a BLE advertising packet, such as one of the ADV_IND packet, the ADV_NONCONN_IND packet, and the ADV_SCAN_IND packet. More particularly, the internal circuit 230 may enter the aforementioned standby mode, the aforementioned suspended mode, or the aforementioned sleep mode of the device B and therefore become inactive (e.g. in a situation where internal circuit 230 represent the processor for controlling the whole of the device B, the device B may become inactive), and then the wake-up service circuit 210 of the device B may scan for the wake-up packet. This is for illustrative purposes only, and is not meant to be a limitation of the present invention. In some other examples, the wake-up service circuit 210 of the device B may scan for the wake-up packet at any time, no matter whether the internal circuit 230 (or the device B) has become inactive or not.

In another example, according to some variations of the embodiment shown in FIG. 8, the wake-up packet can be a BT packet (e.g. the EIR packet). More particularly, the wake-up service circuit 210 of the device B may perform inquiry for discovering the device A, and the device A may send the EIR packet in response to the inquiry.

Similarly, the descriptions in any of the embodiments shown in FIGS. 4-7 and the variations thereof can be applied to the method 800 shown in FIG. 8. Similar descriptions are not repeated in detail.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wake-up control, the method being applied to an electronic device, the method comprising the steps of:
   detecting whether a predetermined wake-up action is input into the electronic device, wherein the predetermined wake-up action is a user action for wake-up control; and
   when it is detected that the predetermined wake-up action is input into the electronic device, sending a wake-up packet carrying predetermined wake-up information to allow an internal circuit of another electronic device to be woken up in response to detection of the predetermined wake-up information, wherein the predetermined wake-up information comprises a company identification (ID), and further comprises a sequence number and a predetermined wake-up pattern, and the sequence number is a variable corresponding to a number of times that the predetermined wake-up action is detected;
   wherein a wake-up service circuit of the other electronic device receives the wake-up packet, detects whether the predetermined wake-up information exists in the wake-up packet, and compares the predetermined wake-up information in the wake-up packet with predetermined wake-up information in the other electronic device; and
   when the predetermined wake-up pattern in the wake-up packet matches the predetermined wake-up information in the other electronic device, but the sequence number does not, the sequence number in the other electronic device will be set to the sequence number in the wake-up packet, and the wake-up service circuit of the other electronic device controls the internal circuit of the other electronic device to resume from suspension.

2. The method of claim 1, further comprising:
   detecting information received from the other electronic device; and
   when the information received from the other electronic device indicates an inactive status of the other electronic device, starting detecting whether the predetermined wake-up action is input into the electronic device.

3. The method of claim 1, wherein the wake-up packet is a Bluetooth Low Energy (BLE) advertising packet; and the wake-up service circuit of the other electronic device scans for the wake-up packet.

4. The method of claim 1, wherein the wake-up packet is an extended inquiry response (EIR) packet; and the wake-up service circuit of the other electronic device performs inquiry for discovering the electronic device.

5. An apparatus for performing wake-up control, the apparatus comprises at least one portion of an electronic device, the apparatus comprising:
   a transmitter arranged to transmit information for the electronic device; and
   a processing circuit, coupled to the transmitter, arranged to control operations of the electronic device, wherein the processing circuit detects whether a predetermined wake-up action is input into the electronic device, wherein the predetermined wake-up action is a user action for wake-up control, and when it is detected that the predetermined wake-up action is input into the electronic device, the processing circuit sends, by utilizing the transmitter, a wake-up packet carrying predetermined wake-up information to allow an internal circuit of another electronic device to be woken up in response to detection of the predetermined wake-up information, wherein the predetermined wake-up information comprises a company identification (ID), and further comprises a sequence number and a predetermined wake-up pattern, and the sequence number is a variable corresponding to a number of times that the predetermined wake-up action is detected;
   wherein a wake-up service circuit of the other electronic device receives the wake-up packet, detects whether the predetermined wake-up information exists in the wake-up packet, and compares the predetermined wake-up information in the wake-up packet with predetermined wake-up information in the other electronic device; and
   when the predetermined wake-up pattern in the wake-up packet matches the predetermined wake-up information in the other electronic device, but the sequence number does not, the sequence number in the other electronic device will be set to the sequence number in the wake-up packet, and the wake-up service circuit of the other electronic device controls the internal circuit of the other electronic device to resume from suspension.

6. The apparatus of claim 5, wherein the processing circuit detects information received from the other electronic device; and when the information received from the other electronic device indicates an inactive status of the other electronic device, the processing circuit starts detecting whether the predetermined wake-up action is input into the electronic device.

7. The apparatus of claim 5, wherein the wake-up packet is a Bluetooth Low Energy (BLE) advertising packet; and the wake-up service circuit of the other electronic device scans for the wake-up packet.

8. The apparatus of claim 5, wherein the wake-up packet is an extended inquiry response (EIR) packet; and the wake-up service circuit of the other electronic device performs inquiry for discovering the electronic device.

9. A method for performing wake-up control, the method being applied to an electronic device, the method comprising the steps of:
   receiving a wake-up packet from another electronic device, detecting whether predetermined wake-up information exists in the wake-up packet, and comparing the predetermined wake-up information in the wake-up packet with predetermined wake-up information in the electronic device, wherein the predetermined wake-up information comprises a company identification (ID), and further comprises a sequence number and a predetermined wake-up pattern; and
   when the predetermined wake-up pattern in the wake-up packet matches the predetermined wake-up information in the electronic device, but the sequence number does not, setting the sequence number in the electronic device to the sequence number in the wake-up packet, and controlling an internal circuit of the electronic device to resume from suspension;

wherein the other electronic device detects whether a predetermined wake-up action is input into the other electronic device, wherein the predetermined wake-up action is a user action for wake-up control, and the sequence number is a variable corresponding to a number of times that the predetermined wake-up action is detected; and when it is detected that the predetermined wake-up action is input into the other electronic device, the other electronic device sends the wake-up packet carrying the predetermined wake-up information to allow the internal circuit of the electronic device to be woken up in response to detection of the predetermined wake-up information.

10. The method of claim 9, wherein the wake-up packet is a Bluetooth Low Energy (BLE) advertising packet; and the method further comprises:

scanning for the wake-up packet.

11. The method of claim 9, wherein the wake-up packet is an extended inquiry response (EIR) packet; and the method further comprises:

performing inquiry for discovering the other electronic device.

12. An apparatus for performing wake-up control, the apparatus comprises at least one portion of an electronic device, the apparatus comprising:

a receiver arranged to receive information for the electronic device; and a wake-up service circuit, coupled to the receiver, arranged to provide the electronic device with a wake-up service, wherein the wake-up service circuit receives, by utilizing the receiver, a wake-up packet from another electronic device, detects whether predetermined wake-up information exists in the wake-up packet, and compares the predetermined wake-up information in the wake-up packet with redetermined wake-u information in the electronic device and when the predetermined wake-up pattern in the wake-up packet matches the predetermined wake-up information in the other electronic device, but the sequence number does not, the sequence number in the electronic device will be set to the sequence number in the wake-up packet, and, the wake-up service circuit controls an internal circuit of the electronic device to resume from suspension, wherein the predetermined wake-up information comprises a company identification (ID), and further comprises a sequence number and a predetermined wake-up pattern;

wherein the other electronic device detects whether a predetermined wake-up action is input into the other electronic device, wherein the predetermined wake-up action is a user action for wake-up control, and the sequence number is a variable corresponding to a number of times that the predetermined wake-up action is detected; and when it is detected that the predetermined wake-up action is input into the other electronic device, the other electronic device sends the wake-up packet carrying the predetermined wake-up information to allow the internal circuit of the electronic device to be woken up in response to detection of the predetermined wake-up information.

13. The apparatus of claim 12, wherein the wake-up packet is a Bluetooth Low Energy (BLE) advertising packet; and the wake-up service circuit of the electronic device scans for the wake-up packet.

14. The apparatus of claim 12, wherein the wake-up packet is an extended inquiry response (EIR) packet; and the wake-up service circuit of the electronic device performs inquiry for discovering the electronic device.

* * * * *